(12) United States Patent
Bleret et al.

(10) Patent No.: US 6,300,900 B1
(45) Date of Patent: Oct. 9, 2001

(54) ANTENNA FOR TRANSMITTING AND/OR RECEIVING SIGNALS WITH RECTILINEAR POLARIZATION

(75) Inventors: Jean Bleret, Croissy; Alain Bourgeois, Eaubonne, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/380,495

(22) PCT Filed: Mar. 2, 1998

(86) PCT No.: PCT/FR98/00399

§ 371 Date: Dec. 1, 1999

§ 102(e) Date: Dec. 1, 1999

(87) PCT Pub. No.: WO98/39666

PCT Pub. Date: Sep. 11, 1998

(30) Foreign Application Priority Data

Mar. 4, 1997 (FR) .................................................. 97 02569

(51) Int. Cl.⁷ .............................. H01Q 21/24; H01Q 3/26
(52) U.S. Cl. .............................................. 342/361; 342/368
(58) Field of Search .................................... 342/361, 362, 342/363, 365, 368, 371, 372

(56) References Cited

U.S. PATENT DOCUMENTS

| | | |
|---|---|---|
| 2,953,781 | 11/1959 | Donnellan et al. . |
| 3,373,433 | 3/1968 | Blaisdell . |
| 3,523,294 | 8/1970 | Soji Okamura et al. . |
| 3,772,701 | 11/1973 | Wilkinson . |
| 5,027,124 | 6/1991 | Fitzsimmons et al. . |

FOREIGN PATENT DOCUMENTS 0 437 190 A2   7/1991   (EP) .

*Primary Examiner*—Thomas H. Tarcza
*Assistant Examiner*—Fred H Mull

(57) ABSTRACT

The antenna for receiving and/or transmitting linearly polarized signals includes at least a first radiating element (24, 26) circularly polarized in one direction and at least a second radiating element (28, 30) circularly polarized in the other direction. The signals with substantially equal amplitudes supplied by the radiating elements circularly polarized in opposite directions are combined to supply a linearly polarized signal. The linear polarization direction is a function of the variable phase-shift ($\Delta\phi$) between the combined signals. A phase-shifter (32) adjusts the polarization direction of the antenna. The adjustment can be automated.

9 Claims, 1 Drawing Sheet

ANTENNA FOR TRANSMITTING AND/OR RECEIVING SIGNALS WITH RECTILINEAR POLARIZATION

BACKGROUND OF THE INVENTION

The invention relates to an antenna for transmitting and/or receiving linearly polarized signals.

In the field of telecommunications, a particular carrier frequency is often used to transmit signals having different polarizations. This provides two channels transmitting different information on the same carrier. If the polarization is circular, one channel is allocated to right-hand circularly polarized signals and the other channel is allocated the signals having a polarization in the opposite direction, i.e. left-hand circular polarization. If the polarization is linear, one channel transmits with "parallel" (or "horizontal") polarization and the other channel transmits signals with a perpendicular (or "vertical") polarization.

Antennas, and in particular ground antennas, are generally designed to receive and/or to transmit signals in the same direction and with a particular polarization. Thus an antenna must both be pointed correctly at the source of transmission and, in the case of linear polarization, it must also be oriented about its axis to maximize reception of the linearly polarized signal.

When an antenna is designed to receive signals from a geostationary satellite, for example, the axis of the antenna must be pointed towards the satellite and its orientation about its axis must maximize the received signal.

An antenna for linearly polarized signals must be set up with particular care. In particular, if the setup is defective, the antenna transmits both with the required polarization and with the perpendicular polarization, which causes interference signals to be transmitted, which signals can then be received by other receivers designed for the perpendicular polarization. Standards generally require an antenna transmitting with linear polarization in a particular direction to be able to transmit with the perpendicular linear polarization only at a level that does not exceed some limit; this limit level is reached if the antenna's angular orientation departs only approximately 1° from its optimum orientation.

Until now, the polarization of the antenna has been adjusted manually.

It has been found that the result of such adjustment is not always satisfactory. Furthermore, it can vary with time.

Also, the adjustment of the antenna is verified only by confirming that the received signal has the expected qualities. When a television signal is received, for example, the adjustment is deemed to be correct when the quality of the picture is satisfactory. This type of verification is sometimes insufficient, however, especially in the case of a transmit antenna.

SUMMARY OF THE INVENTION

The invention remedies these drawbacks. It provides an antenna provided with means for simple, and preferably automatic, adjustment of its orientation with regard to the linear polarization that it is intended to receive and/or transmit.

The antenna in accordance with the invention is characterized in that it includes at least a first radiating element circularly polarized in one direction and at least a second radiating element circularly polarized in the other direction, the signals with substantially equal amplitudes supplied by the radiating elements circularly polarized in opposite directions being combined to supply a linearly polarized signal, the direction of the linear polarization being a function of a variable phase-shift between the combined signals.

The invention is based on the observation that the combination of two signals with the same amplitude and circularly polarized in opposite directions provides a linearly polarized signal inclined at an angle θ to the axis of the antenna which is equal to half the phase difference between the signals. This property is explained below.

The invention therefore provides means of adjusting the orientation of the antenna, as a function of the direction of linear polarization of the signal to be received or transmitted, in a manner which is simpler and more reliable than mechanical adjustment.

To carry out the adjustment, a perpendicular polarization (or cross polarization) signal is detected and the phase shift is chosen that produces a minimum signal level for the cross polarization. An adjustment based on minimizing the cross polarization is much more accurate than an adjustment based on maximizing the required polarization.

The adjustment can easily be automated.

An adjustment using received signals is equally valid for transmission provided that the frequency band of the transmitted signals is near the band of the received signals. For example, the receive adjustment will be equally valid for transmission in the case of reception at a carrier frequency of 4 gigahertz and transmission at a carrier frequency of 6 gigahertz.

The adjustment is carried out using either a reference signal from the transmitter station, for example a geostationary satellite, or the received payload signal. In the latter case, the adjustment can be carried out automatically and continuously, for example at the start of each call.

In one embodiment of the invention, means are provided for indicating that correct adjustment of the orientation of the antenna with regard to the direction of linear polarization cannot be obtained. For example, if the minimum of the received cross polarization signal exceeds a predetermined threshold, an alarm signal is transmitted. It is preferable for the user to be advised of this situation because under these circumstances there is a risk of transmitting a polluting signal. As an alternative to this feature, or complementing it, means can be provided which automatically prohibit transmission when the minimum cross polarization signal exceeds a threshold.

The number of radiating elements with left-hand or right-hand circular polarization is not limited to one. It can be greater. The only constraints are that the number of elements with left-hand circular polarization must be equal to the number of elements with right-hand circular polarization and that the signals applied to the elements with polarization in opposite directions must have substantially the same amplitude.

When the number of circularly polarized elements in each direction is not less than two, these elements can be used as an active antenna for fine adjustment of pointing, i.e. of the direction of the axis of the antenna.

Pointing can be adjusted either by seeking a signal maximum on the axis of the antenna or a minimum on the axis of the antenna.

For example, to seek a minimum, in particular a null signal, the four radiating elements are fed with signals of the same amplitude but with regularly spaced phases, for example 0°, 90°, 180° and 270°.

The preferred embodiment relates to a reflector antenna, the radiating elements being at the focus of the reflector.

BRIEF DESCRIPTION OF THE DRAWINGS

Other features and advantages of the invention become apparent from the description of certain embodiments of the invention given with reference to the accompanying drawings, in which.

DETAILED DESCRIPTION OF THE INVENTION

Figure 1:
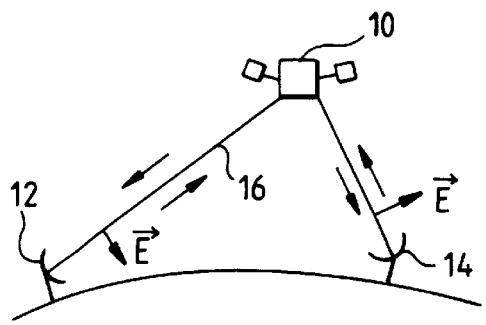
FIG. 1 is a diagram showing a telecommunications system using an antenna in accordance with the invention.

The example to be described with reference to the figures concerns a telecommunications system in which a geostationary satellite 10 communicates with a plurality of ground stations each of which has an antenna 12, 14, etc. (FIG. 1). The data transmitted constitutes telephone calls, for example. Signals are transmitted from each ground station 12, 14 to the satellite 10 on a carrier frequency of 6 gigahertz and signals are transmitted from the satellite to the ground stations on a carrier frequency of 4 gigahertz.

In the following description, the expression "uplink signals" is sometimes used for the signals transmitted by the ground stations to the satellite and the expression "downlink signals" is sometimes used for the signals transmitted from the satellite 10 to the ground stations.

All these signals are linearly polarized. A linearly polarized signal is a signal for which the electric field vector $\vec{E}$, which is always perpendicular to the propagation direction 16, propagates parallel to itself. This property of the polarization of the signals is used to transmit data of different types with two orthogonal polarizations on a given carrier frequency. One polarization is often called the "horizontal" polarization and the perpendicular, or cross, polarization is often called the "vertical" polarization, even if the vector $\vec{E}$ is neither horizontal nor vertical.

One problem that the invention seeks to solve is that of facilitating adjustment of the antennas 12, 14 for receiving a signal with the required polarization, for example the horizontal polarization.

Figure 2:
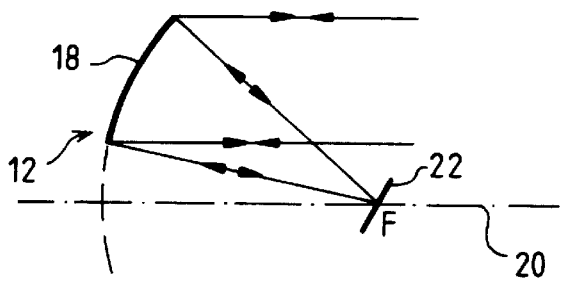
FIG. 2 is a diagram of an antenna to which the invention applies.

An antenna generally includes a reflector 18 with (receive/transmit) radiating elements at its focus F (FIG. 2). The axis 20 of the antenna 12 must of course be directed towards the station with which it is to communicate, i.e. towards the satellite 10 in this example. Adjusting the direction of the axis 20, which must coincide with the direction 16 (FIG. 1), is known as "pointing" the antenna.

The radiating elements must additionally be oriented around the axis 20 on a support 22 at the focus F of the reflector 18 so that the antenna receives the required polarization H and not the cross polarization V.

The invention proposes simple and effective means for carrying out this adjustment.

Figure 3:
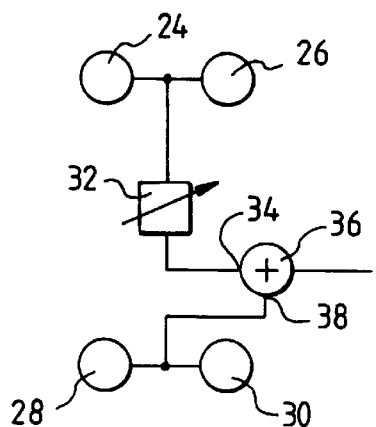
FIGS. 3 and 4 are diagrams showing a part of the antenna in accordance with the invention.

To this end, right-hand circularly polarized radiating elements 24, 26 and left-hand circularly polarized radiating elements 28, 30 are provided on the support 22 (FIG. 3). The radiating elements 24, 26 are connected together to the first input 34 to an adder 36 via a phase-shifter 32 providing a variable phase-shift. The second input 38 of the adder 36 receives the left-hand circularly polarized signals supplied by the radiating elements 28, 30.

As explained below, a linearly polarized signal is obtained at the output of the adder 36 which is oriented at a particular angle θ to an axis Ox in the plane of the plate 22. The angle θ is a function of the phase-shift Δϕ between the signals at the inputs 34 and 38 of the adder 36.

A circularly polarized signal is a signal for which the electric field $\vec{E}$ turns at uniform speed about the propagation axis. This rotation about the propagation axis is effected in a particular direction, either to the right or to the left.

The signal at the first input 34 of the adder 36 has a polarization vector $E_1$ with the following complex value:

$$E_1 = (x+jy)e^{j\Delta\phi} \quad (1)$$

Figure 5:
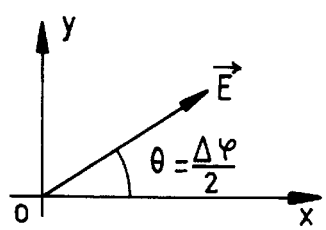
FIG. 5 is a diagram used to explain how the antenna in accordance with the invention works.
Figure 6:
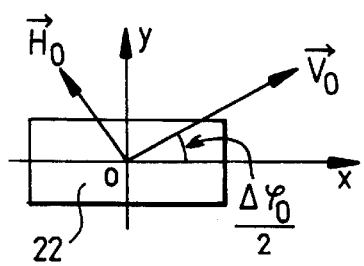
FIG. 6 is a diagram also used to explain one aspect of how the antenna in accordance with the invention works.

In the above equation: $\underline{x}$ is the abscissa of the electric field vector, $\underline{y}$ its ordinate in the xOy system of, axes in the plane of the plate 22 (FIGS. 5 and 6), $\underline{j}$ is the imaginary number such that $j^2=-1$ and $\Delta\phi$ is the phase-shift conferred by the phase-shifter 32.

A signal is obtained at the input 38 of the adder 36 whose polarization vector $E_2$ has the following complex value:

$$E_2 = x - jy \quad (2)$$

The components $\underline{x}$ and $\underline{y}$ of the vector $E_2$ are the same as those of the vector $E_1$ because the amplitudes of these signals are the same.

The sum of these two values, i.e. the sum of the vectors $E_1$ and $E_2$ is a vector with abscissa X and ordinate Y such that:

$$X = 1 + e^{j\Delta\varphi} = \sqrt{2(1+\cos\Delta\varphi)} \cdot e^{j\frac{\Delta\varphi}{2}} = 2\cos\frac{\Delta\varphi}{2} \cdot e^{j\frac{\Delta\varphi}{2}} \quad (3)$$

$$Y = -j(1 + e^{j\Delta\varphi}) = \sqrt{2(1-\cos\Delta\varphi)} \cdot e^{j\frac{\Delta\varphi}{2}} = 2\sin\frac{\Delta\varphi}{2} \cdot e^{j\frac{\Delta\varphi}{2}} \quad (4)$$

Equations (3) and (4) above show that the electric field $\vec{E}$ (FIG. 5) of the signal at the output of the adder 36 has constant amplitude and is at an angle θ=Δϕ/2 to the axis Ox. Clearly adjusting the phase-shift Δϕ varies the preferred direction of polarization of the antenna.

The antenna is generally factory set so that the polarization direction corresponds to the site where the antenna is to be installed, i.e. the antenna is preset so that the horizontal polarization or the vertical polarization is at a particular angle to the axis Ox. This presetting corresponds to the vectors $\vec{V}_0$ and $\vec{H}_0$ in FIG. 6. In this case, the angle between the vector $\vec{V}_0$ and the axis Ox is equal to $\Delta\phi_0/2$.

The phase-shifter 32 enables precise adjustment to be performed during installation of the antenna or afterwards. The adjustment is carried out as follows:

The circuits associated with the antenna often include, firstly an input for the signals to be transmitted, namely an input for the signals with polarization H, and secondly one or two outputs for the received signals, i.e. an output for signals with polarization H and possibly an output for signals with polarization V.

For the adjustment, the antenna is connected to the polarization perpendicular to the polarization for which the antenna must be adjusted. In this example the antenna is to be adjusted for polarization H and the antenna is therefore connected to the receive input for polarization V and the adjustment is carried out to minimize the received signal. In the vicinity of the perpendicular polarization minimum, the gradient of the variation is known to be very steep, i.e. the adjustment can be very precise, whereas in contrast, near the maximum of the normal polarization, the variation is slow, which would not allow precise adjustment if the adjustment were carried out in the vicinity of this maximum.

For the perpendicular polarization minimum, the phase-shift has a value $\Delta\phi_1$. To obtain the phase-shift for the polarization H, a phase-shift of 180° is added (i.e. a 90° rotation of the electric field vector).

The adjustment is preferably carried out automatically, for example using a switch which switches the received signal from the input H for normal use to the input V for the adjustment, means for automatically varying the phase-shift introduced by the phase-shifter 32 and a differentiator for detecting the minimum signal at the output of the adder 36, and using means for storing in a memory the value $\Delta\phi_1$ of the phase-shift, plus 180°, which corresponds to the minimum supplied by the differentiator. When the adjustment has been carried out, the switch returns the received signal from the input V to the input H. Note that it is not indispensable to provide an input V accessible from the outside.

The adjustment is carried out once and for all, for example, using a reference signal transmitted by the geostationary satellite 10.

Alternatively, the adjustment is carried out using a payload signal, i.e. one of the usual signals, for example a received telephone signal.

In some systems, when a station 12 transmits uplink signals to the satellite 10, it receives from the satellite 10 in return, after transposition, a downlink signal corresponding to the transmitted signal. In this case, the adjustment using the return signal optimizes the polarization adjustment for transmission. In an advantageous embodiment of the invention, the adjustment procedure is used to monitor correct operation of the antenna in order to transmit an alarm signal and/or to stop transmission in the event of a malfunction.

To be more precise, the circuits periodically and automatically adjust the orientation of antenna polarization. If the minimum cross polarization signal exceeds a threshold, an alarm signal is transmitted and/or transmission is prohibited. In this case, the antenna transmits an interference signal with cross polarization, which is unacceptable in some applications.

The antenna with radiating elements as shown in FIG. 3 is an active antenna. The presence of these radiating elements can be used for fine pointing adjustment, i.e. fine adjustment of the direction in which the antenna transmits or receives.

Although only two radiating elements with left-hand circular polarization and two radiating elements with right-hand circular polarization have been described, it goes without saying that the invention is not limited to this number. The number of radiating elements of each category is not less than 1. This number and the distribution of the radiating elements are principally functions of the configuration of the reflector and of the required directivity. The arrays of radiating elements differ according to whether the reflector has a circular or eccentric structure, as shown in FIG. 2, or for a double-reflector antenna.

The elements represented in FIG. 3 are the receive radiating elements. Analogous elements are provided for transmission.

Figure 4:
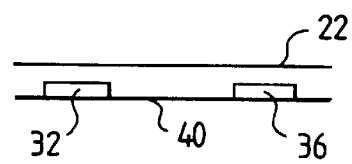

In the example shown in FIG. 4, the radiating elements are deposited on a rectangular plate substrate 22. They are in the form of solid "patch" conductors. The phase-shifter 32 and the adder 34 and other components of the circuit are disposed on another substrate 40, the coupling between the radiating elements and the circuits on the substrate 40 being effected without contact.

Although the radiating elements form an active antenna enabling electronic adjustment of pointing and polarization direction, these features can be combined with a motorized system (not shown) for slaving the direction of antenna pointing to the satellite, the electronic adjustment being primarily a fine adjustment.

The antenna can be automatically and periodically adjusted during periods of reception of a payload signal in which that signal does not carry any payload data. Transmission of digital signals in the form of packets includes such periods, e.g. between the transmission of packets.

The invention is not limited to a transmit/receive antenna. It also relates to a method of generating linearly polarized signals which is characterized in that signals circularly polarized in opposite directions and having substantially equal amplitudes are combined. A phase-shift is preferably imposed on the combined signals to impose a direction on the linear polarization.

What is claimed is:

1. An antenna for receiving and/or transmitting linearly polarized signals, the linear polarization being synthesized from two components which are circularly polarized in opposite directions and which have substantially equally amplitudes, by combining said two components after a relative phase-shift ($\Delta\phi$) that is adjustable between the combined signals, the value of the shift determining the orientation of said linear polarization, the antenna being characterized in that it includes a plurality n of radiating elements that are circularly polarized in one direction and a plurality n of radiating elements that are circularly polarized in the opposite direction, and a pointing direction controller which uses said elements to vary the pointing direction of the antenna.

2. An antenna according to claim 1, characterized in that it includes a phase shift controller which automatically varies the relative phase-shift ($\Delta\phi$), and a measuring circuit which measures the received signals, and wherein said phase shift controller stops variation of the phase-shift when a received signal is optimized.

3. An antenna according to claim 2, characterized in that the phase-shift is adjusted to minimize the received signal with having polarization perpendicular to a desired polarization.

4. An antenna according to claim 2, characterized in that the phase-shift between signals is adjusted using a received payload signal.

5. An antenna according to claim 4, characterized in that the phase-shift is adjusted automatically and periodically.

6. An antenna according to claim 1, characterized in that it includes an adder receiving at one input a signal supplied by the output of a variable phase-shifter whose input receives from a radiating element signals circularly polarized in one direction, the other input of the adder receiving, with no phase-shift, signals from the radiating element circularly polarized in the other direction.

7. An antenna according to claim 3, characterized in that it includes an alarm signal transmitter transmitting an alarm signal when a minimum received signal with polarization perpendicular to the desired polarization exceeds a threshold.

8. An antenna according to claim 3, characterized in that it includes a circuit which prevents transmission when a minimum received signal with polarization perpendicular to a desired polarization exceeds a threshold.

9. An antenna according to claim 1, characterized in that the radiating elements are disposed on a substrate at the focus of a reflector.

* * * * *